United States Patent
Alfred et al.

(10) Patent No.: US 10,843,791 B2
(45) Date of Patent: Nov. 24, 2020

(54) SYSTEM AND METHOD FOR CONTROLLING ROTORCRAFT

(71) Applicant: Textron Innovations Inc., Providence, RI (US)

(72) Inventors: Jillian Samantha Alfred, Fort Worth, TX (US); Christopher M. Bothwell, Grapevine, TX (US)

(73) Assignee: Textron Innovations Inc., Providene, RI (US)

( * ) Notice: Subject to any disclaimer, the term of this patent is extended or adjusted under 35 U.S.C. 154(b) by 365 days.

(21) Appl. No.: 15/981,525

(22) Filed: May 16, 2018

(65) Prior Publication Data

US 2019/0351995 A1   Nov. 21, 2019

(51) Int. Cl.
*B64C 13/18*  (2006.01)
*B64C 13/04*  (2006.01)
*B64D 31/06*  (2006.01)
*B64C 13/50*  (2006.01)

(52) U.S. Cl.
CPC .............. *B64C 13/18* (2013.01); *B64C 13/04* (2013.01); *B64D 31/06* (2013.01); *B64C 13/503* (2013.01)

(58) Field of Classification Search
CPC ......... B64C 13/18; B64C 13/16; B64C 13/04; B64C 13/503; B64D 31/06
USPC ....................................................... 244/76 R
See application file for complete search history.

(56) References Cited

U.S. PATENT DOCUMENTS

| | | | |
|---|---|---|---|
| 4,947,334 A | | 8/1990 | Massey et al. |
| 5,816,533 A | * | 10/1998 | Krysinsky ............. B64C 27/001 244/17.13 |
| 10,474,237 B2 | * | 11/2019 | Gush ....................... G06F 3/016 |
| 2004/0010354 A1 | * | 1/2004 | Nicholas ............... B64C 13/503 701/4 |
| 2007/0001052 A1 | * | 1/2007 | Strehlow ................. F16F 15/02 244/99.1 |
| 2013/0054053 A1 | * | 2/2013 | Greenfield ............. B64D 43/00 701/3 |

(Continued)

FOREIGN PATENT DOCUMENTS

| | | | | |
|---|---|---|---|---|
| EP | 2450764 A2 | | 5/2012 | |
| EP | 3570136 A1 | * | 11/2019 | ............. B64D 31/06 |

OTHER PUBLICATIONS https://ntrs.nasa.gov/archive/nasa/casi.ntrs.nasa.gov/19900009911.pdf Mar. 1990.*

(Continued)

*Primary Examiner* — Christopher P Ellis
(74) *Attorney, Agent, or Firm* — Slater Matsil, LLP

(57) ABSTRACT

In an embodiment, a rotorcraft includes: a rotor system; a sensor; a flight control device; and a flight control computer (FCC) coupled to the rotor system, the sensor, and the flight control device, the FCC configured to: determine a rotation speed of the rotor system; select a first aeroservoelasticity filter configuration from a plurality of aeroservoelasticity filter configurations according to the rotation speed of the rotor system, the aeroservoelasticity filter configurations being predetermined configurations corresponding to different rotation speeds of the rotor system; receive a signal from the sensor; filter the signal according to the first aeroservoelasticity filter configuration; and adjust the flight control device according to the filtered signal.

20 Claims, 5 Drawing Sheets

(56) References Cited

U.S. PATENT DOCUMENTS

2013/0282205 A1* 10/2013 Bailly ................. G05D 1/0858
    701/3
2018/0329430 A1* 11/2018 Bothwell ................ B64C 27/82

OTHER PUBLICATIONS https://www.sciencedirect.com/science/article/pii/S1000936118302875 Aug. 2018.*

Konstanzer, et al., "Decentralized Vibration Control and Coupled Aeroservoelastic Simulation of Helicopter Rotor Blades with Adaptive Airfoils," Journal of Intelligent Material Systems and Structures, vol. 12, Apr. 2001, pp. 209-214.

Masarati, et al., "An Integrated Environment for Helicopter Aeroservoelastic Analysis: The Ground Resonance Case," Curran Associates, 2011, downloaded from URL:https://dspace-erf.nlr.nl/xmlui/bitsream/handle/20.500.11881/835/ERF%202011_177.pdf?sequence=1, 12 pages.

\* cited by examiner

SYSTEM AND METHOD FOR CONTROLLING ROTORCRAFT

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

In an embodiment, a method includes: determining a rotation speed of a rotor system of a rotorcraft; selecting a first aeroservoelasticity filter configuration from a plurality of aeroservoelasticity filter configurations according to the rotation speed of the rotor system, each of the aeroservoelasticity filter configurations being a predetermined configuration corresponding to a different respective rotation speed of the rotor system; receiving a signal from a sensor of the rotorcraft; filtering the signal according to the first aeroservoelasticity filter configuration; and adjusting a flight control device of the rotorcraft according to the filtered signal.

In some embodiments, the method further includes: before selecting the first aeroservoelasticity filter configuration, changing output power of an engine connected to the rotor system such that the rotation speed of the rotor system varies. In some embodiments of the method, the first aeroservoelasticity filter configuration is selected in response to changing the output power of the engine. In some embodiments, the method further includes: transitioning from a second aeroservoelasticity filter configuration to the first aeroservoelasticity filter configuration after changing the output power of the engine, the second aeroservoelasticity filter configuration corresponding to a rotation speed of the rotor system before changing the output power of the engine. In some embodiments of the method, each of the aeroservoelasticity filter configurations corresponds to a different respective center filtering frequency. In some embodiments of the method, for each of the aeroservoelasticity filter configurations, the respective center filtering frequency is a predetermined value corresponding to a different modal frequency of the rotorcraft at the respective rotation speed of the rotor system. In some embodiments of the method, the sensor is a rate sensor. In some embodiments of the method, the sensor is an accelerometer. In some embodiments of the method, the sensor is a pilot flight control.

In an embodiment, a rotorcraft includes: a rotor system; a sensor; a flight control device; and a flight control computer (FCC) coupled to the rotor system, the sensor, and the flight control device, the FCC configured to: determine a rotation speed of the rotor system; select a first aeroservoelasticity filter configuration from a plurality of aeroservoelasticity filter configurations according to the rotation speed of the rotor system, the aeroservoelasticity filter configurations being predetermined configurations corresponding to different rotation speeds of the rotor system; receive a signal from the sensor; filter the signal according to the first aeroservoelasticity filter configuration; and adjust the flight control device according to the filtered signal.

In some embodiments, the rotorcraft further includes: an engine connected to the rotor system, where the FCC is further configured to change output power of the engine such that the rotation speed of the rotor system varies. In some embodiments of the rotorcraft, the first aeroservoelasticity filter configuration is selected in response to changing the output power of the engine. In some embodiments of the rotorcraft, the FCC is further configured to: transition from a second aeroservoelasticity filter configuration to the first aeroservoelasticity filter configuration, the second aeroservoelasticity filter configuration corresponding to a rotation speed of the rotor system before changing the output power of the engine. In some embodiments of the rotorcraft, each of the aeroservoelasticity filter configurations corresponds to a different respective center filtering frequency. In some embodiments of the rotorcraft, for each of the aeroservoelasticity filter configurations, the respective center filtering frequency is a predetermined value corresponding to a different modal frequency of the rotorcraft at the respective rotation speed of the rotor system. In some embodiments of the rotorcraft, the sensor is a rate sensor. In some embodiments of the rotorcraft, the sensor is an accelerometer. In some embodiments of the rotorcraft, the sensor is a pilot flight control.

In an embodiment, a rotorcraft includes: an engine connected to a rotor system; pilot flight controls; a flight control device; and a flight control computer (FCC) coupled to the engine, the pilot flight controls, and the flight control device, the FCC configured to: detect a change in power output of the engine; determine a first aeroservoelasticity filter configuration in response to the change in power output of the engine, the first aeroservoelasticity filter configuration including a plurality of filter weights and center frequencies; receive a signal from the pilot flight controls; filter the signal according to the filter weights and center frequencies of the first aeroservoelasticity filter configuration; and adjust the flight control device according to the filtered signal.

In some embodiments of the rotorcraft, the filter weights and center frequencies of the first aeroservoelasticity filter configuration each correspond to a notch filter or a bandpass filter.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
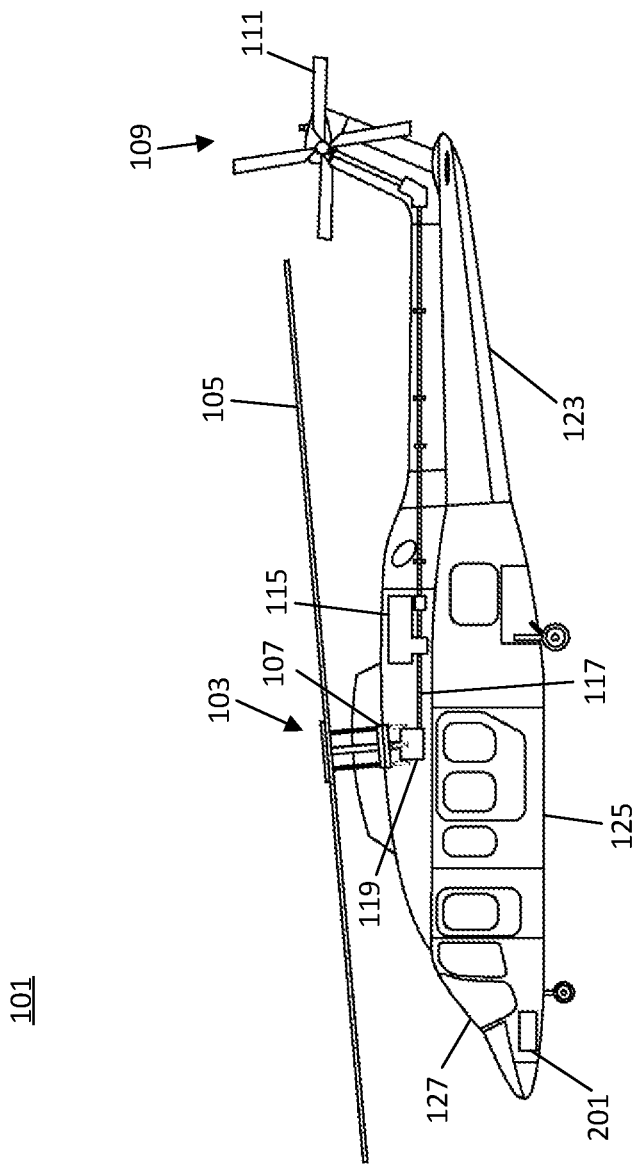
FIG. 1 illustrates a rotorcraft, according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW system controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW system controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system use the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

FIG. 1 illustrates a rotorcraft 101, according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the main rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case cockpit 127 could be eliminated entirely in order to save space and cost.

Figure 2A:
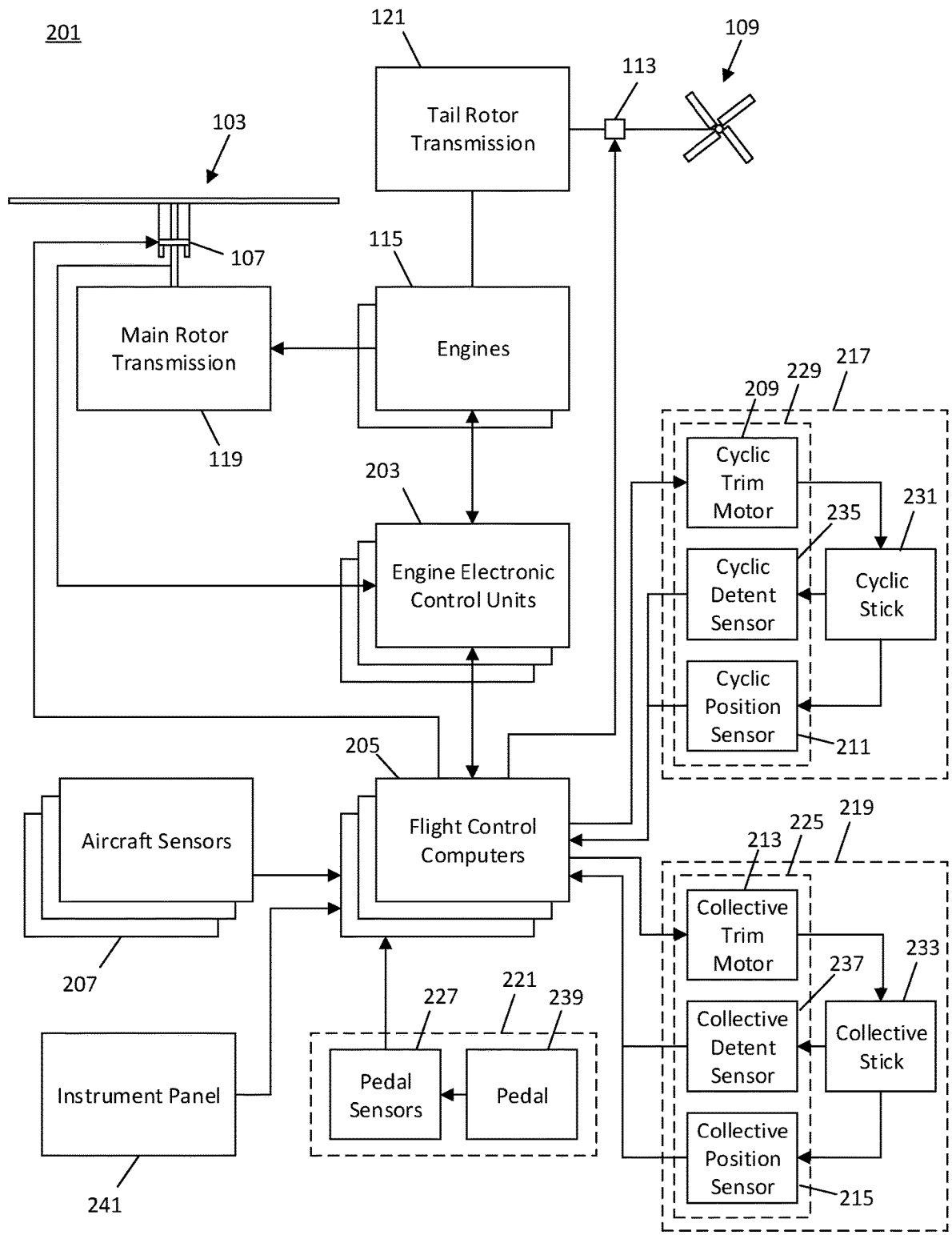
FIG. 2A is a block diagram of a fly-by-wire flight control system, according to some embodiments.
Figure 2B:
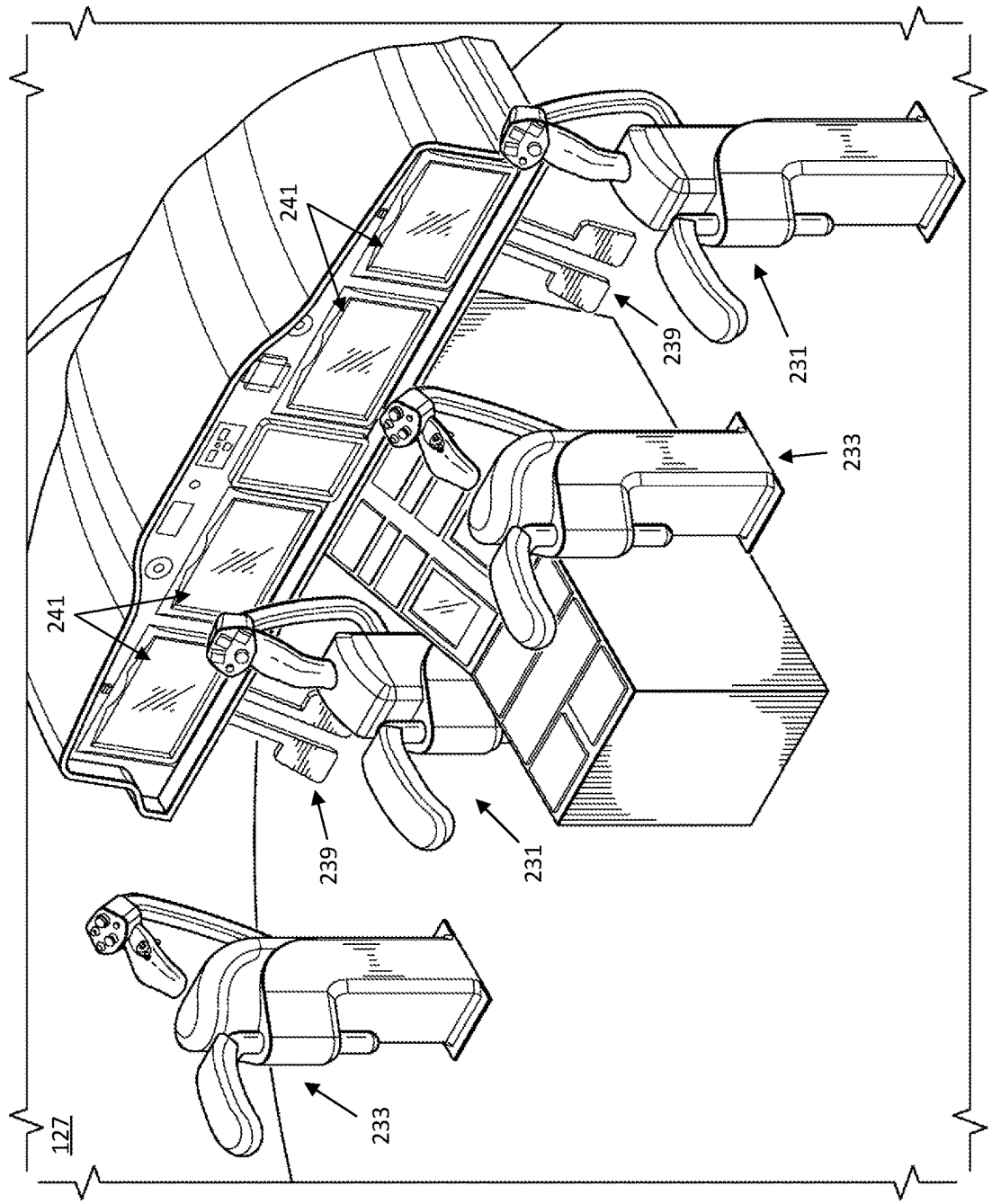
FIG. 2B illustrates the inside of a cockpit, according to some embodiments.

FIG. 2A is a block diagram of a fly-by-wire flight control system 201 for the rotorcraft 101, according to some embodiments. FIG. 2B illustrates the inside of the cockpit 127, according to some embodiments, and is described in conjunction with FIG. 2A. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft 101. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other aircraft sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a positon determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 209 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic trim motors 209 and collective trim motors 213 may drive the cyclic stick 231 and collective stick 233, respectively, to suggested positions. The cyclic trim motors 209 and collective trim motors 213 may drive the cyclic stick 231 and collective stick 233, respectively, to suggested positions, but this movement capability may also be used to provide tactile cueing to a pilot. The cyclic trim motors 209 and collective trim motors 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the cyclic trim motors 209 and collective trim motors 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. The cyclic detent sensor 235 and collective detent sensor 237 detect motion and/or position of the respective control stick that is caused by pilot input, as opposed to motion and/or position caused by commands from the FCCs 205, rotorcraft vibration, and the like and provide feedback signals indicative of such to the FCCs 205. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
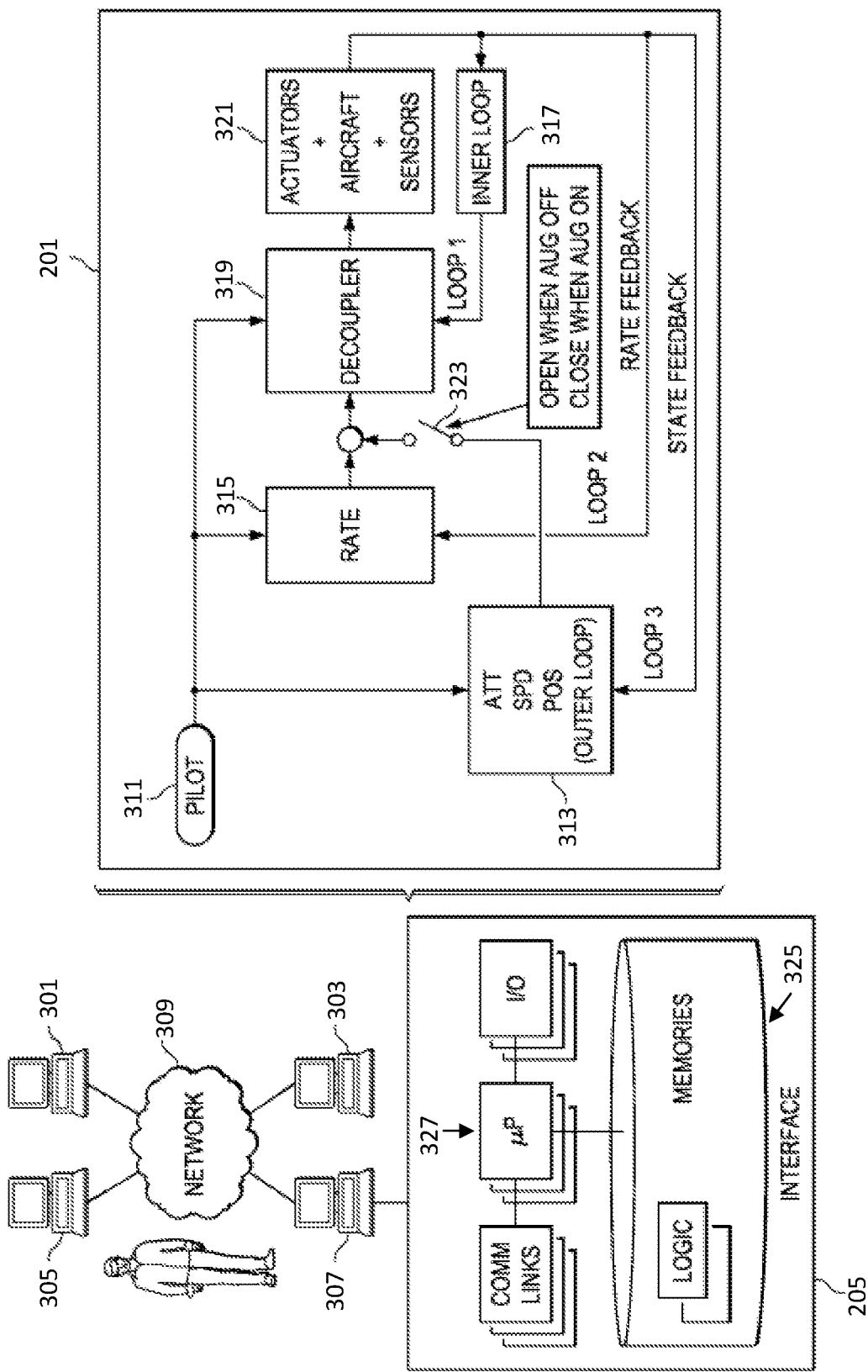
FIG. 3 is a block diagram of a three-loop flight control system, according to some embodiments.

FIG. 3 is a block diagram of the flight control system 201, according to some embodiments. Some operational aspects of the flight control system 201 are shown in a highly schematic fashion. In particular, the flight control system 201 is schematically shown as being implemented as a series of inter-related feedback loops running certain control laws. Although the flight control system 201 is illustrated as being a three-loop flight control system, it should be appreciated that the flight control system 201 could be implemented in a different manner, such as with a different quantity of control loops.

In some embodiments, elements of the flight control system 201 may be implemented at least partially by the FCCs 205. However, all, some, or none of the components (301, 303, 305, 307) of flight control system 201 could be located external or remote from the rotorcraft 101 and communicate to on-board devices through a network connection 309.

The flight control system 201 has a pilot input 311, an outer loop 313, a middle loop 315, an inner loop 317, a decoupler 319, and aircraft equipment 321 (corresponding, e.g., to flight control devices such as swashplate 107, tail rotor transmission 121, etc.; to actuators (not shown) driving the flight control devices; to sensors such as aircraft sensors 207, cyclic position sensors 211, collective position sensors 215, cyclic detent sensors 235, collective detent sensors 237, etc.; and the like).

In the example shown, a three-loop design separates the inner stabilization and rate feedback loops from outer guidance and tracking loops. The control law structure primarily assigns the overall stabilization task and related tasks of reducing pilot workload to inner loop 317. Next, the middle loop 315 (sometimes called the rate loop) provides rate augmentation. Outer loop 313 focuses on guidance and tracking tasks. Since inner loop 317 and middle loop 315 provide most of the stabilization, less control effort is required at the outer loop level. As representatively illustrated, a switch 323 may be provided to turn outer loop flight augmentation on and off, the tasks of outer loop 313 are not necessary for flight stabilization.

In some embodiments, the inner loop 317 and middle loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. According to some embodiments, the control laws running in the illustrated loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

The flight control system 201 may be realized as programming executed by the FCCs 205. The programming includes instructions implementing aspects of the flight control system 201. The FCCs 205 may include memories 325, such as non-transitory computer readable storage mediums, that store the programming. One or more processors 327 are connected to the memories 325, and are operable to execute the programming.

During operation of the rotorcraft 101, the frequency of inputs (such as the pilot flight controls) may be coupled to the modal frequency of the rotorcraft 101 by the pilot. Coupling of the inputs to the rotorcraft 101 is referred to as aircraft-pilot coupling (APC). APC may be classified as closed-loop feedback (where the pilot's commands are continuous and depend upon pilot-perceived differences between desired and actual aircraft responses), or may be classified as open-loop feedback (where the pilot operates as a forcing function, generating commands that are not directly related to the pilot's perception of aircraft motion). An example of open-loop feedback is when modal frequencies of the rotorcraft 101 (such as vibrations from the main rotor blades 105) are transferred to the pilot flight controls through the pilot's physical touch (e.g., vibrations shake the pilot, which shakes the flight controls). Open-loop feedback may cause the pilot flight controls to seem less responsive. An example of closed-loop feedback is when the pilot inadvertently commands an increasing series of corrections in opposite directions, with each correction being an attempt to correct the aircraft's reaction to the previous input with an overcorrection in the opposite direction. Closed-loop feedback may be particularly problematic when the pilot inputs diverge, and in some cases may result in failure of the rotorcraft 101.

APC may be avoided or reduced by filtering signals input to the FCCs 205. Such filtering is sometimes referred to as aeroservoelasticity filtering. In an aeroservoelastic filtering systems, signals from, e.g., the aircraft sensors 207 and pilot flight controls are filtered with notch and/or bandpass filters. Values for the center frequency and bandwidth of the notch and/or bandpass filters are predetermined based on observed modal frequencies of the rotorcraft 101 during testing. An aeroservoelastic filtering system may be implemented by the FCCs 205 as part of the flight control system 201, such as part of the decoupler 319.

The main rotor system 103 is a variable speed rotor system. For example, the ECCUs 203 may be used to vary the output power of the engines 115, which may be performed in response to, e.g., changing the pitch of the main rotor blades 105. Noise produced by the main rotor system 103 varies with the rotational speed of the main rotor system 103. As such, a variable speed rotor system may afford the pilot more control over the noise produced by the rotorcraft 101 than a fixed-speed rotor system, aiding in regulatory compliance. However, rotors are finely tuned rotating masses, and the main rotor system 103 may vibrate at different modal frequencies depending on the rotation speed of the main rotor blades 105. Thus, although the use of variable speed rotor systems allow control over noise output, it may also exacerbate APC. Increasing the bandwidth of filters used by the aeroservoelastic filter system may help avoid APC, but may cause the pilot flight controls to seem less responsive by filtering out good signals.

Figure 4:
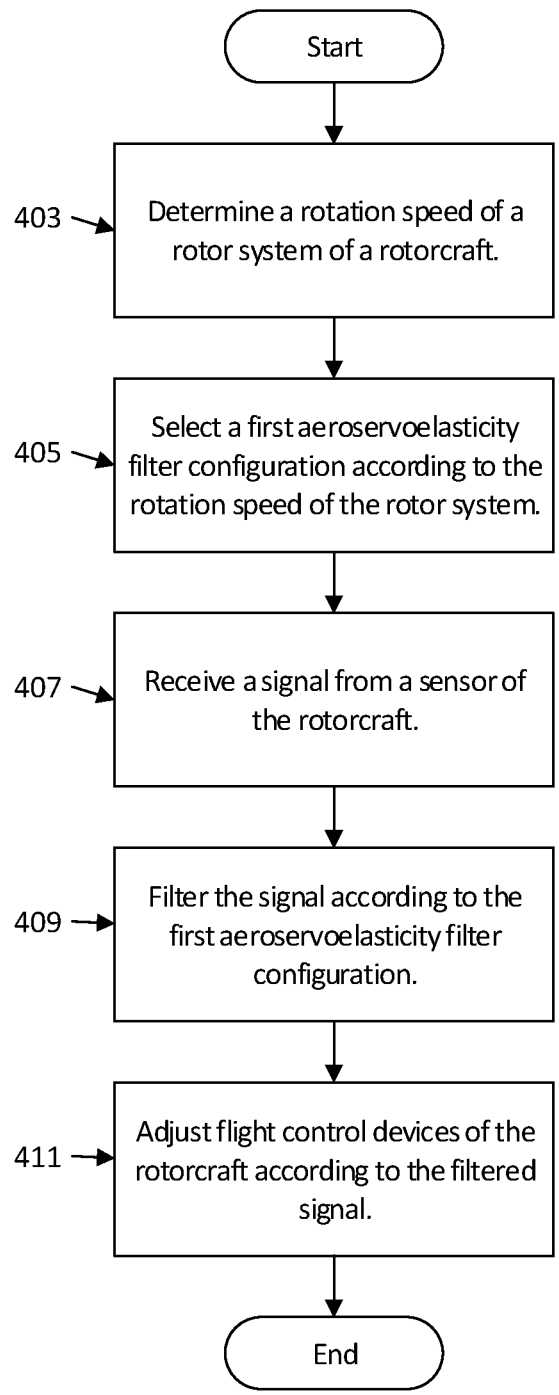
FIG. 4 is a flow diagram of a method for aeroservoelastic filtering, in accordance with some embodiments.

FIG. 4 is a flow diagram of a method 401 for aeroservoelastic filtering, in accordance with some embodiments. The method 401 implements aeroservoelastic filtering using variable filters, such that the filter parameters used by the aeroservoelastic filter are changed according to a determined speed of the main rotor system 103. The method 401 may be implement in software or as hardware. For example, the method 401 may be performed by the FCCs 205 as part of the flight control system 201, may be implemented in a digital signal processor (DSP) that filters input signals from the pilot flight controls, may be part of the programming for execution by the processor 327, or may be implemented in other ways.

In process 403, the rotation speed of the main rotor system 103 is determined. The rotation speed may be determined by reading the output power or engine speed from the ECCUs 203, by receiving a notification at the FCCs 205 that the engine speed has changed, or the like. For example, the rotation speed may be determined by the FCCs 205 in response to the FCCs 205 successfully changing the output power of the engines 115.

In process 405, a aeroservoelasticity filter configuration is selected according to the rotation speed of the main rotor system 103. The selected aeroservoelasticity filter configuration is selected from a plurality of aeroservoelasticity filter configurations. Each filter configuration includes values for the center frequency and bandwidth of the notch and/or bandpass filter(s) that make up a given aeroservoelasticity filter. The filter parameters of each filter configuration may be predetermined values, and correspond to a given rotation speed (and thus the modal frequencies at that speed) of the main rotor system 103.

As an example of selecting an aeroservoelasticity filter configuration, the plurality of aeroservoelasticity filter configurations may be stored in, e.g., a lookup table that contains a range of engine speeds. The determined rotation speed of the main rotor system 103 is used to search the lookup table for the configuration corresponding to the determined rotation speed.

In process 407, a signal is received from a sensor of the rotorcraft 101. The sensor may be a device the pilot does not interact with, such as one of the aircraft sensors 207, such as a rate sensor, an accelerometer, or the like. The sensor may also be one of the pilot flight controls, such as the cyclic stick 231, collective stick 233, or pedals 239.

In process 409, the received signal is filtered according to the selected aeroservoelasticity filter configuration. For example, portions of the received signal at the center frequencies specified by the aeroservoelasticity filter configuration may be reduced by weights specified by the aeroservoelasticity filter configuration. The filtering may be performed by the FCCs 205, as part of one of the control loops, such as the inner loop 317. Alternatively, the filtering may be performed by an external device (e.g., a DSP) that filters the electrical signal read by the FCCs 205. In embodiments where an external device is used, the external device may be programmed by the FCCs 205 with the values for the selected aeroservoelasticity filter configuration.

In some embodiments, a transition may be performed on the selected aeroservoelasticity filter configuration. A transition is performed when a current aeroservoelasticity filter configuration is in use, and a new aeroservoelasticity filter configuration is selected. In such embodiments, a fading operation between the configurations may be performed, such that the filter weights for the current aeroservoelasticity filter configuration are gradually diminished and the filter weights for the new aeroservoelasticity filter configuration are gradually increased. Fading between configurations may improve the responsiveness of pilot flight controls.

In process 411, flight of the rotorcraft 101 is controlled based on the filtered sensor signal. Values in the filtered sensor signal may be used by one or more loops of the flight control system 201, such as the outer loop 313, middle loop 315, and/or inner loop 317. The flight control devices of the rotorcraft 101 may be adjusted to change the flight characteristics of the rotorcraft 101. For example, the swashplate 107 may be actuated based on the filtered sensor signal to maintain a particular speed or direction, to automate an approach to hover or landing, or the like. Likewise, the tail rotor actuator 113 may be adjusted based on the filtered sensor signal. In some embodiments, the filtered sensor signal may be used to influence other functionality of the flight control system 201. For example, the decoupler 319 may use the filtered sensor signal when decoupling pilot flight controls, or the middle loop 315 may use the filtered sensor signal when stabilizing the rotorcraft 101.

Although the method 401 is discussed in the context of the main rotor system 103, it should be appreciate that embodiments may be used with other rotor systems. As an example, embodiments may also be used to filter vibrations produced by the tail rotor 109.

Embodiments may achieve advantages. By using a different aeroservoelasticity filter configuration for each rotation speed, the bandwidth of the notch and/or bandpass filters in each filter system may be reduced. Reducing the bandwidth of pilot flight control signal filters may cause the pilot flight controls to seem more responsive to the pilot, while still reducing APC by filtering out modal frequencies for the rotation speed.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   determining a rotation speed of a rotor system of a rotorcraft;
   selecting a first aeroservoelasticity filter configuration from a plurality of aeroservoelasticity filter configurations according to the rotation speed of the rotor system, each of the aeroservoelasticity filter configurations being a predetermined configuration corresponding to a different respective rotation speed of the rotor system;
   receiving a signal from a sensor of the rotorcraft;
   filtering the signal according to the first aeroservoelasticity filter configuration; and
   adjusting a flight control device of the rotorcraft according to the filtered signal.

2. The method of claim 1, further comprising:
   before selecting the first aeroservoelasticity filter configuration, changing output power of an engine connected to the rotor system such that the rotation speed of the rotor system varies.

3. The method of claim 2, wherein the first aeroservoelasticity filter configuration is selected in response to changing the output power of the engine.

4. The method of claim 2, further comprising:
   transitioning from a second aeroservoelasticity filter configuration to the first aeroservoelasticity filter configuration after changing the output power of the engine, the second aeroservoelasticity filter configuration corresponding to a rotation speed of the rotor system before changing the output power of the engine.

5. The method of claim 1, wherein each of the aeroservoelasticity filter configurations corresponds to a different respective center filtering frequency.

6. The method of claim 5, wherein, for each of the aeroservoelasticity filter configurations, the respective center filtering frequency is a predetermined value corresponding to a different modal frequency of the rotorcraft at the respective rotation speed of the rotor system.

7. The method of claim 1, wherein the sensor is a rate sensor.

8. The method of claim 1, wherein the sensor is an accelerometer.

9. The method of claim 1, wherein the sensor is a pilot flight control.

10. A rotorcraft comprising:
    a rotor system;
    a sensor;
    a flight control device; and
    a flight control computer (FCC) coupled to the rotor system, the sensor, and the flight control device, the FCC configured to:
    determine a rotation speed of the rotor system;
    select a first aeroservoelasticity filter configuration from a plurality of aeroservoelasticity filter configurations according to the rotation speed of the rotor system, the aeroservoelasticity filter configurations being predetermined configurations corresponding to different rotation speeds of the rotor system;
    receive a signal from the sensor;
    filter the signal according to the first aeroservoelasticity filter configuration; and
    adjust the flight control device according to the filtered signal.

11. The rotorcraft of claim 10, further comprising:
    an engine connected to the rotor system, wherein the FCC is further configured to change output power of the engine such that the rotation speed of the rotor system varies.

12. The rotorcraft of claim 11, wherein the first aeroservoelasticity filter configuration is selected in response to changing the output power of the engine.

13. The rotorcraft of claim 11, wherein the FCC is further configured to:
    transition from a second aeroservoelasticity filter configuration to the first aeroservoelasticity filter configuration, the second aeroservoelasticity filter configuration corresponding to a rotation speed of the rotor system before changing the output power of the engine.

14. The rotorcraft of claim 10, wherein each of the aeroservoelasticity filter configurations corresponds to a different respective center filtering frequency.

15. The rotorcraft of claim 14, wherein, for each of the aeroservoelasticity filter configurations, the respective center filtering frequency is a predetermined value corresponding to a different modal frequency of the rotorcraft at the respective rotation speed of the rotor system.

16. The rotorcraft of claim 10, wherein the sensor is a rate sensor.

17. The rotorcraft of claim 10, wherein the sensor is an accelerometer.

18. The rotorcraft of claim 10, wherein the sensor is a pilot flight control.

19. A rotorcraft comprising:
an engine connected to a rotor system;
pilot flight controls;
a flight control device; and
a flight control computer (FCC) coupled to the engine, the pilot flight controls, and the flight control device, the FCC configured to:
  detect a change in power output of the engine;
  determine a first aeroservoelasticity filter configuration in response to the change in power output of the engine, the first aeroservoelasticity filter configuration comprising a plurality of filter weights and center frequencies;
  receive a signal from the pilot flight controls;
  filter the signal according to the filter weights and center frequencies of the first aeroservoelasticity filter configuration; and
  adjust the flight control device according to the filtered signal.

20. The rotorcraft of claim 19, wherein the filter weights and center frequencies of the first aeroservoelasticity filter configuration each correspond to a notch filter or a bandpass filter.

* * * * *

UNITED STATES PATENT AND TRADEMARK OFFICE
CERTIFICATE OF CORRECTION

PATENT NO. : 10,843,791 B2  
APPLICATION NO. : 15/981525  
DATED : November 24, 2020  
INVENTOR(S) : Jillian Samantha Alfred Page 1 of 1

It is certified that error appears in the above-identified patent and that said Letters Patent is hereby corrected as shown below:

On the Title Page

Item (73) Assignee, Line 1, delete "Providene" and insert --Providence--.

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*